United States Patent
Choi et al.

(10) Patent No.: US 10,359,651 B2
(45) Date of Patent: Jul. 23, 2019

(54) APPARATUS AND METHOD OF CONTROLLING OPTICAL MODULATOR BIAS BASED ON EYE-AMPLITUDE MONITORING

(71) Applicant: INDUSTRY-ACADEMIC COOPERATION FOUNDATION, YONSEI UNIVERSITY, Seoul (KR)

(72) Inventors: Woo Young Choi, Seoul (KR); Min Hyeong Kim, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 15/417,319

(22) Filed: Jan. 27, 2017

(65) Prior Publication Data
US 2017/0227796 A1  Aug. 10, 2017

(30) Foreign Application Priority Data
Feb. 4, 2016 (KR) .................. 10-2016-0014420

(51) Int. Cl.
  *G02F 1/01*   (2006.01)
  *H04B 10/50*  (2013.01)
  *G02F 1/21*   (2006.01)

(52) U.S. Cl.
  CPC ..... *G02F 1/0123* (2013.01); *H04B 10/50575* (2013.01); *G02F 2001/212* (2013.01); *G02F 2201/58* (2013.01); *H04Q 2201/804* (2013.01)

(58) Field of Classification Search
  CPC .................... G02F 1/0123; G02F 2201/58
  See application file for complete search history.

(56) References Cited

U.S. PATENT DOCUMENTS 4,475,210 A * 10/1984 Couch ............. H04L 1/20 327/69
4,694,468 A *  9/1987 Cullum ........... H04L 1/20 324/76.15

(Continued)

FOREIGN PATENT DOCUMENTS

KR  10-2006-0065865 A  6/2006
KR  10-0606100 B1     7/2006

(Continued)

OTHER PUBLICATIONS

High-Speed Circuits & Systems Laboratory, Yonsei University, available at http://tera.yonsei.ac.kr/pu_1.php.*

(Continued)

*Primary Examiner* — Peter Radkowski
(74) *Attorney, Agent, or Firm* — Sughrue Mion, PLLC (57) ABSTRACT

Disclosed is technology for controlling a bias using an integrated circuit (IC) instead of using a pilot tone. A bias control apparatus includes a photodetector configured to convert at least a portion of data included in an output from an optical modulator to an electrical signal; a power detector configured to convert a root mean square (RMS) value of an amplitude of the converted data to an analog voltage; a comparator configured to compare the output voltage and a pre-stored track hold value; and a bias controller configured to control a bias voltage to be within a preset range from an optimal voltage based on the comparison result.

4 Claims, 7 Drawing Sheets

(56) References Cited

U.S. PATENT DOCUMENTS

| | | | | |
|---|---|---|---|---|
| 5,343,324 | A * | 8/1994 | Le | G02F 1/0123 398/154 |
| 6,317,247 | B1 * | 11/2001 | Yang | G02F 1/0123 359/239 |
| 6,687,451 | B1 * | 2/2004 | Sikora | G02F 1/0123 398/187 |
| 6,700,907 | B2 * | 3/2004 | Schneider | G02F 1/0123 250/205 |
| 7,336,749 | B2 * | 2/2008 | Garlepp | H04L 1/20 375/355 |
| 7,590,175 | B2 * | 9/2009 | Leibowitz | G01R 31/31709 327/50 |
| 7,596,175 | B2 * | 9/2009 | Chen | H04L 1/20 327/50 |
| 7,627,029 | B2 * | 12/2009 | Ho | H04L 25/03006 327/50 |
| 8,149,023 | B2 * | 4/2012 | Rajagopalan | H03K 17/6872 327/108 |
| 8,385,492 | B2 * | 2/2013 | Ho | H04L 25/03006 375/340 |
| 8,817,932 | B2 * | 8/2014 | Ho | H04L 25/03006 375/340 |
| 9,116,810 | B2 * | 8/2015 | Ho | H04L 25/03006 |
| 9,544,071 | B2 * | 1/2017 | Ho | H04L 25/03006 |

FOREIGN PATENT DOCUMENTS

| | | |
|---|---|---|
| KR | 10-2011-0015633 A | 2/2011 |
| KR | 10-2012-0028984 A | 3/2012 |
| KR | 10-1190863 B1 | 10/2012 |
| KR | 10-2015-0013678 A | 2/2015 |

OTHER PUBLICATIONS

Lee et al., A fully-integrated 12.5-Gb/s 850-nm CMOS optical receiver based on a spatially-modulated avalanche photodetector, Optics Express, V. 22, N. 3, p. 2511, 2014.*

Lee et al., "Clock and Data Recovery Circuit Using Digital Phase Aligner and Phase Interpolator," 2006 49th IEEE International Midwest Symposium on Circuits and Systems, San Juan, PR, 2006, pp. 690-693. doi: 10.1109/MWSCAS.2006.382156.*

Youn et al., An integrated 12.5-Gb/s optoelectronic receiver with a silicon avalanche photodetector in standard SiGe BiCMOS technology, Optics Express., V. 20, N.27, 28153, 2012.*

Youn et al., "High-Speed CMOS Integrated Optical Receiver With an Avalanche Photodetector," in IEEE Photonics Technology Letters, vol. 21, No. 20, pp. 1553-1555, Oct. 15, 2009.*

Yu, Byung-Min, Silicon Optical Modulator, Yonsei University, 2010/2014, available at http://tera.yonsei.ac.kr/class/2014_1_2/lecture/Silicon%20optical%20Modulator.pdf.*

An Integrated Mach-Zehnder Modulator Bias Controller Based on Eye-Amplitude Monitoring; M.-H. Kim, H.-Y. Jung, L. Zimmermann, W.-Y. Choi; Proc. SPIE , 9751, 97510X-1 (2016).*

Yu, Byung-Min, "Silicon Optical Modulator," Silicon Optical Photonics Nature Photonics published online: Jul. 30, 2010; dbgudals1989@gmail.com.

Communication from the Korean Patent Office dated Oct. 16, 2017 in corresponding Korean patent Application No. 10-2016-0014420.

Communication from the Korean Patent Office dated Dec. 19, 2017 in corresponding Korean patent Application No. 10-2016-0014420.

* cited by examiner

APPARATUS AND METHOD OF CONTROLLING OPTICAL MODULATOR BIAS BASED ON EYE-AMPLITUDE MONITORING

CROSS-REFERENCE TO RELATED APPLICATION

This application claims the priority benefit of Korean Patent Application No. 10-2016-0014420 filed on Feb. 4, 2016, in the Korean Intellectual Property Office, the disclosure of which is incorporated herein by reference.

BACKGROUND

1. Field of the Invention

Example embodiments relate to technology for controlling a bias using an integrated circuit (IC) instead of using a pilot tone, and more particularly, to technology for controlling a bias to maximize an eye output by directly monitoring an output of data, that is, eye, which differs from an existing harmonic monitoring method.

2. Related Art

An amount of data handled at various types of information technology (IT) systems, including a cloud service and a social network service (SNS), is currently on the astronomical increase. Accordingly, the demand for an optical communication interface for high speed data transmission is increasing. For the optical communication, a transmission end needs an optical modulator configured to convert an electrical signal to an optical signal. As for the optical modulator, a Mach-Zehnder modulator (MZM) and a ring modulator (RM) are currently most widely used and studied.

Figure 1A:
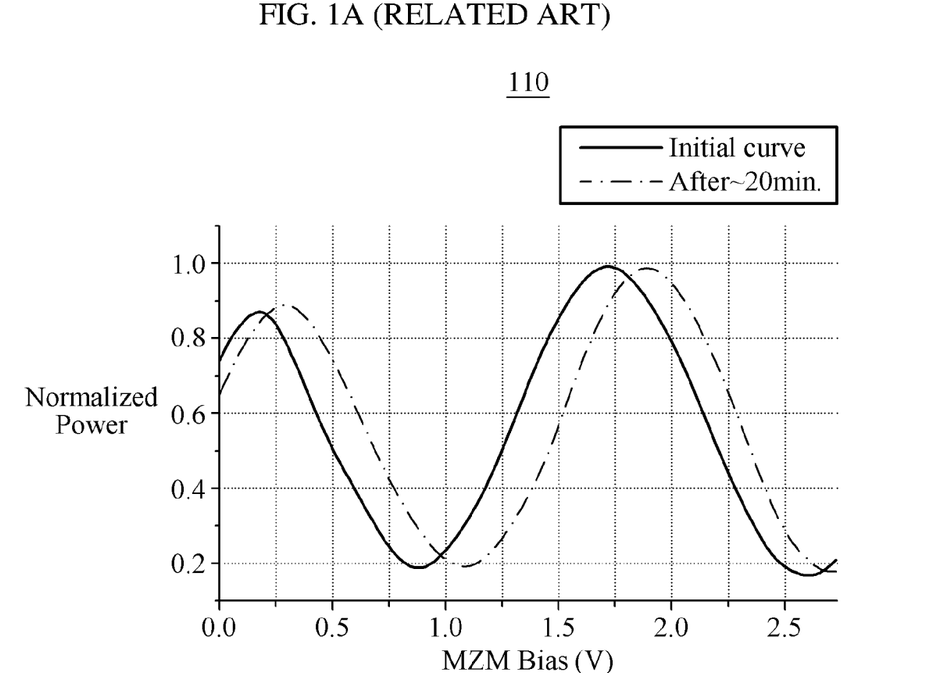
FIG. 1A and FIG. 1B illustrate a change in a characteristic of an optical modulator according to the related art.
Figure 1B:
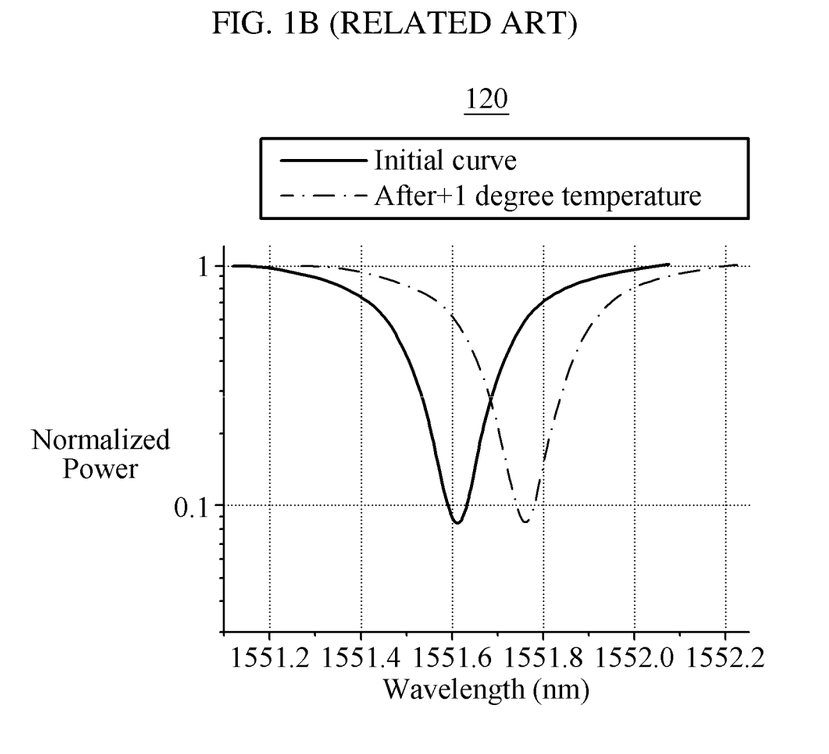

However, as shown in graphs 110 of FIG. 1A and graphs 120 of FIG. 1B, the optical modulators experience a significant change in a direct current (DC) bias due to a temperature. Thus, a bias control circuit for controlling the DC bias is required to have productivity in the reality.

FIG. 1A and FIG. 1B illustrate a change in a characteristic of an optical modulator according to the related art.

The graph 110 of FIG. 1A shows a change in a characteristic curve of a Mach-Zehnder-typed optical modulator over time, and the graph 120 of FIG. 1B shows a change in a characteristic curve of a ring-typed optical modulator according to a change in a temperature. Each of the two graphs 110 of FIG. 1A and 120 of FIG. 1B shows an initial curve and a curve after going through a bias change after 20 minutes. It can be known from the graphs 110 and 120 that a bias control circuit is required.

As an existing method for bias correction, disclosed is a method of finding a bias of an optical modulator using a pilot tone, for example, Korean Patent Registration No. 10-1190863 and Korean Patent Registration No. 10-0606100. This method applies a DC bias of a modulator to which a clean pilot tone is added and controls a bias using a second harmonic component among a plurality of harmonic components monitored at an output end. In a transfer function of the modulator, the linearity varies based on a bias location and sizes of even and odd harmonic components vary.

If a DC bias is controlled to minimize an amplitude of a signal acquired by monitoring the second harmonic component, biasing may be performed to a point at which the linearity of the transfer function is maximized. Since the linearity is directly used, the above method may be used based on a proposition that a point corresponding to the largest linearity is an optimal bias, such as in an MZM. In addition, the above method has some additional disadvantages. First, a clean pilot tone needs to be additionally provided from an outside. Second, a pilot tone needs to be provided using a small amplitude and a low speed of a few kHz in order to avoid the effect against a data signal. Accordingly, due to the small amplitude of the pilot tone, a sensitivity of a signal required to acquire the second harmonic component may be significantly small, which may lead to triggering a signal-to-noise ratio (SNR) issue. Also, due to a significantly low center frequency of a band-pass filter required for monitoring, integration to an IC may not be performed in the reality. As a matter of fact, an operation of completely integrating a bias control circuit on a single IC using the above method has not been reported.

SUMMARY

According to an aspect, there is provided a bias control apparatus including a photodetector configured to convert at least a portion of data included in an output from an optical modulator to an electrical signal; a power detector configured to convert a root mean square (RMS) value of an amplitude of the converted data to an analog voltage; a comparator configured to compare the output voltage and a pre-stored track hold value; and a bias controller configured to control a bias voltage to be maintained within a preset range from an optimal voltage based on the comparison result.

The bias controller may include a digital controller configured to output a counter for controlling up or down of the bias voltage based on the comparison result; and a digital-to-analog converter configured to convert the output counter to an analog form, and the optical modulator may be further configured to receive the analog-converted output of the counter and to control a bias.

The bias control apparatus may further include a track-and-hold circuit. The track-and-hold circuit may be configured to output a signal that periodically iterates a track and a hold based on a clock signal.

The track-and-hold circuit may be further configured to control the output voltage to be transitorily stored during a single cycle.

The comparator may be further configured to compare the output voltage and output of the track-and-hold circuit value corresponding to a hold state of the track-and-hold circuit.

The comparator may be further configured to determine up or down of a counter based on whether a current output voltage is greater or less than an output voltage stored in a previous half cycle.

The comparator may be further configured to determine an up or down direction of the counter to be maintained when the current output voltage is greater than or equal to the output voltage stored in the previous half cycle.

The comparator may be further configured to determine an up or down direction of the counter to be switched when the current output voltage is less than the output voltage stored in the previous half cycle.

According to an aspect, there is provided an operation method of a bias control apparatus at least transitorily configured by a computer, the method including converting at least a portion of data included in an output from an optical modulator to an electrical signal; converting an RMS value of an amplitude of the converted data to an analog voltage; comparing the output voltage and a pre-stored track hold value; and controlling a bias voltage to be maintained within a preset range from an optimal voltage based on the comparison result.

The controlling may include outputting a counter for controlling up or down of the bias voltage based on the comparison result; and converting the output counter to an analog form. The optical modulator may be configured to receive the analog-converted output of the counter and to control a bias.

The bias control method may further include outputting a signal that periodically iterates a track and a hold based on a clock signal; and controlling the output voltage to be transitorily stored during a single cycle.

The comparing may include comparing the output voltage and output of the track-and-hold circuit value corresponding to a hold state of the track-and-hold circuit.

The comparing may include determining up or down of a counter based on whether a current output voltage is greater or less than an output voltage stored in a previous half cycle; and determining an up or down direction of the counter to be maintained when the current output voltage is greater than or equal to the output voltage stored in the previous half cycle, and determining the up or down direction of the counter to be switched when the current output voltage is less than the output voltage stored in the previous half cycle.

According to an aspect, there is provided a program of a bias control apparatus at least transitorily configured by a computer, the program including a set of instructions configured to convert at least a portion of data included in an output from an optical modulator to an electrical signal; a set of instructions configured to convert an RMS value of an amplitude of the converted data to an analog voltage; a set of instructions configured to compare the output voltage and a pre-stored track hold value; and a set of instructions configured to control a bias voltage to be maintained within a preset range from an optimal voltage based on the comparison result.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION OF THE INVENTION

Hereinafter, example embodiments will be described with reference to the accompanying drawings, wherein like reference numerals refer to like elements throughout. However, the scope of the disclosure is not limited thereto or restricted thereby.

The terminology used herein is for the purpose of describing particular example embodiments only, and is not to be used to limit the disclosure. As used herein, the terms "a," ",an," and "the" are intended to include the plural forms as well, unless the context clearly indicates otherwise. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In particular example embodiments, terms arbitrarily selected by the applicant may be used. In this case, the meaning thereof will be disclosed in the corresponding portion. Unless otherwise defined, all terms including technical and scientific terms used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Figure 2:
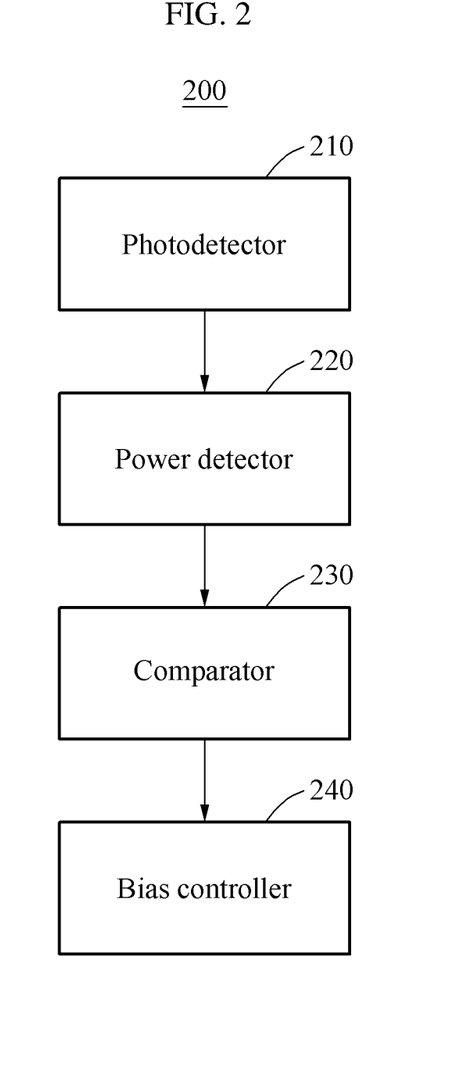
FIG. 2 is a block diagram illustrating a bias control apparatus according to an example embodiment.

FIG. 2 is a block diagram illustrating a bias control apparatus according to an example embodiment.

Referring to FIG. 2, a bias control apparatus 200 may include a photodetector 210, a power detector 220, a comparator 230, and a bias controller 240. The bias control apparatus 200 may be at least transitorily configured by a computing terminal. The computing terminal may include various types of electronic devices, for example, a personal computer (PC), a medical device, a smartphone, a tablet computer, a wearable device, and the like. Each of a photodetector 210, the power detector 220, the comparator 230, and the bias controller 240 may be a physical and/or logical element included in such electronic device. For example, a photodetector 210, the power detector 220, the comparator 230, and the bias controller 240 may be configured using universal operation resources controlled by, for example, dedicated hardware or software, or an operating system. Also, a photodetector 210, the power detector 220, the comparator 230, and the bias controller 240 may be configured on a single chip without physical separation. A configuration of a hardware resource may be modified with the development of technology or based on a design change. Thus, although functions, operations, and structures of a photodetector 210, the power detector 220, the comparator 230, and the bias controller 240 are understood to be distinguished from each other, different interpretation may be applicable depending on example embodiments.

The bias control apparatus 200 according to an example embodiment proposes a new method that may completely integrate a plurality of elements on an integrated circuit (IC) without using a pilot tone. The present disclosure may directly monitor an output of data, that is, eye, and may optimally maintain an amplitude of data eye when a bias of an optical modulator, for example, a Mach-Zehnder modulator (MZM), a ring modulator (RM), etc., is optimal. That is, instead of controlling a bias to have an optimal linearity, the present disclosure may control a bias to maximize an output of data eye. According to an example embodiment, there may be no need to use an external signal, for example, a pilot tone, and a low frequency band-pass filter that may not be readily produced as an IC. Further, a sensitivity of a monitoring signal may significantly increase.

To this end, the bias control apparatus 200 includes a photodetector 210, the power detector 220, the comparator 230, and the bias controller 240.

In detail, a photodetector 210 converts at least a portion of data included in an output from an optical modulator to an electrical signal.

The power detector 220 converts a root mean square (RMS) value of an amplitude of the converted data to an output voltage $V_{RMS}$, and outputs the output voltage $V_{RMS}$.

The comparator 230 compares the output voltage $V_{RMS}$ and a pre-stored track hold value $V_{T/H}$. For example, the bias control apparatus 200 may further include a track-and-hold circuit. The track-and-hold circuit outputs a signal that periodically iterates a track and a hold based on a clock signal. Also, the track-and-hold circuit may control the output voltage $V_{RMS}$ to be transitorily stored during a single cycle.

The comparator 230 may compare the output voltage $V_{RMS}$ and output of the track-and-hold circuit value $V_{T/H}$.

The comparator 230 may compare the output voltage $V_{RMS}$ and a value corresponding to a hold state of the track-and-hold circuit.

For example, the comparator 230 may compare the output voltage $V_{RMS}$ and output of the track-and-hold circuit value $V_{T/H}$ at a falling edge of a clock signal. Also, the comparator 230 may determine up or down of a counter based on whether a current output voltage $V_{RMS}$ is greater or less than an output voltage $V_{RMS}$ stored in a previous cycle. For example, the comparator 230 may determine up or down of the counter based on whether a current output voltage $V_{RMS}$ is greater or less than an output voltage $V_{RMS}$ stored in a previous half cycle.

In detail, when the current output voltage $V_{RMS}$ is greater or less than the output voltage $V_{RMS}$ stored in the previous half cycle, the comparator 230 may determine an up or down direction of the counter to be maintained. On the contrary, when the current output voltage $V_{RMS}$ is less than the output voltage $V_{RMS}$ stored in the previous half cycle, the comparator 230 may determine the up or down direction of the counter to be switched.

The bias controller 240 controls a bias voltage to be maintained within a preset range from an optimal voltage based on the comparison result.

For example, the bias controller 240 may include a digital controller configured to output a counter for controlling up or down of the bias voltage based on the comparison result, and a digital-to-analog converter configured to convert the output counter to an analog form. In this instance, the optical modulator receives the analog-converted output of the counter and controls a bias. For example, the bias controller 240 may supply the optimal bias voltage to the optical modulator by maintaining or switching an up or down direction of the counter based on the comparison result of the comparator 230.

Figure 3:
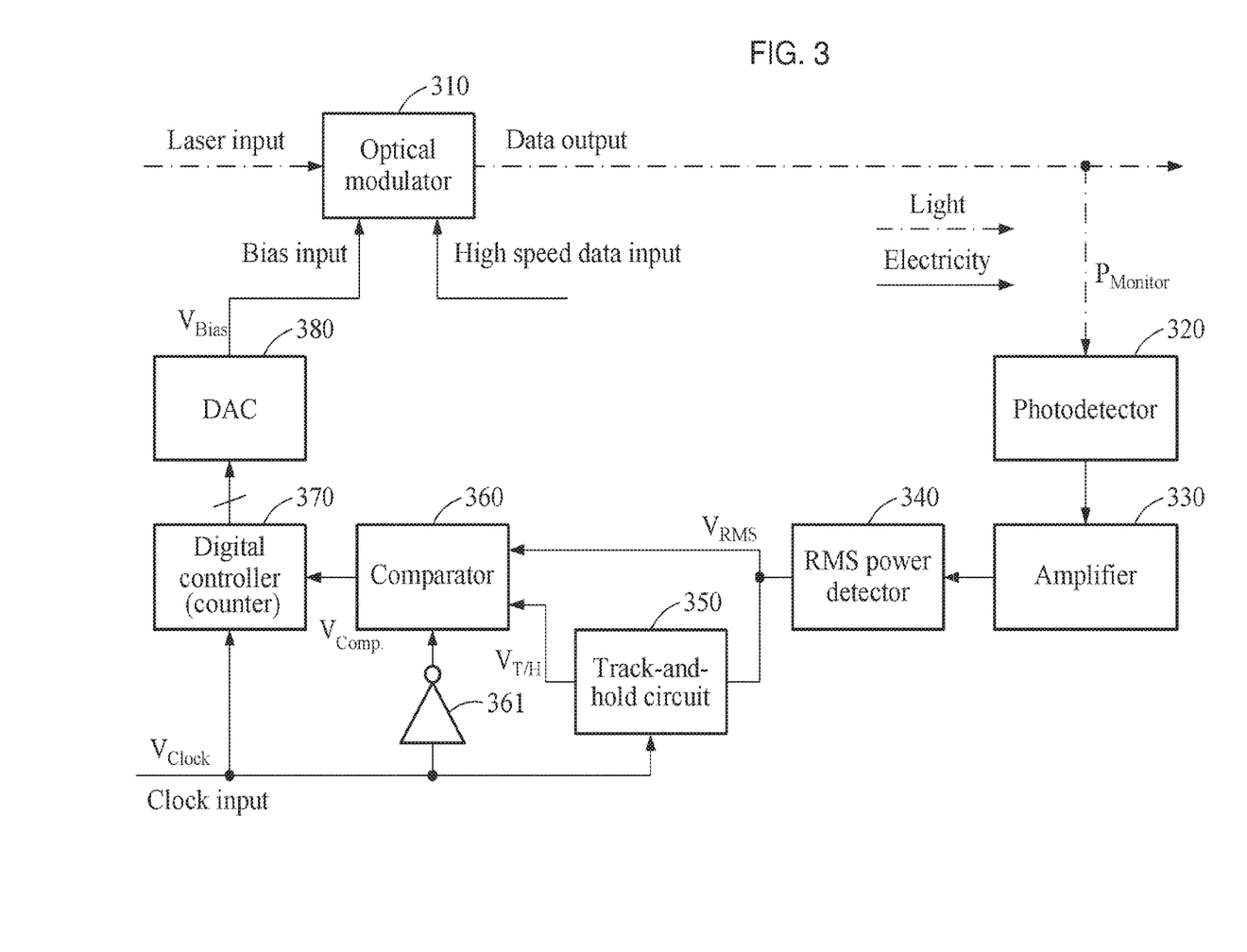
FIG. 3 is a block diagram illustrating a detail configuration of a bias control apparatus according to an example embodiment.

FIG. 3 is a block diagram illustrating a detail configuration of a bias control apparatus according to an example embodiment.

Referring to FIG. 3, an optical modulator 310 is provided at an upper end, and a photodetector 320 and an amplifier 330 configured to monitor a portion of an output of the optical modulator 310 as an electrical signal are provided at a subsequent end. A root mean square (RMS) power detector 340 is required to monitor an amplitude of a converted data signal. The RMS power detector 340 is a circuit configured to convert an RMS value of a data amplitude to an output voltage $V_{RMS}$.

Initially, a bias input scheme will be described prior to describing a bias control scheme. A bias voltage to be applied to the optical modulator 310 is generated using a digital-to-analog converter (DAC) 380. Such an input digital code uses an output of a counter of a digital controller 370 and controls the bias voltage by adjusting an up or down direction of the counter. To determine a control direction, a track-and-hold circuit 350 and a comparator 360 may be provided at an output end of the RMS power detector 340.

Using the track-and-hold circuit 350, a signal iterates a track and a hold in synchronization with a clock signal for driving the bias control apparatus ($V_{T/H}$). For example, the track indicates if clock signal=0, and the hold indicates if clock signal=1. Using the track-and-hold circuit 350, an RMS value of data amplitude may be transitorily stored in an analog form during a single cycle. The comparator 360 compares two inputs, for example, the output voltage $V_{RMS}$ and output of the track-and-hold circuit value $V_{T/H}$ at a falling edge of the clock signal by applying an inverter to the clock signal. When the RMS value of the amplitude is greater or less than a value stored in a previous cycle, an output $V_{Comp}$ of the comparator 360 becomes 1. In this situation, an up or down direction of the counter matches a direction in which the amplitude of data increases and thus, the corresponding direction of the counter is maintained. However, when the RMS value of the amplitude is less than the value, the output $V_{Comp}$ of the comparator 360 becomes 0. That is, the up or down direction of the counter matches a direction in which the amplitude of data decreases and thus, the corresponding direction of the counter needs to be switched. Through the above process, a bias voltage may be maintained to be around an optimal voltage.

Figure 4A:
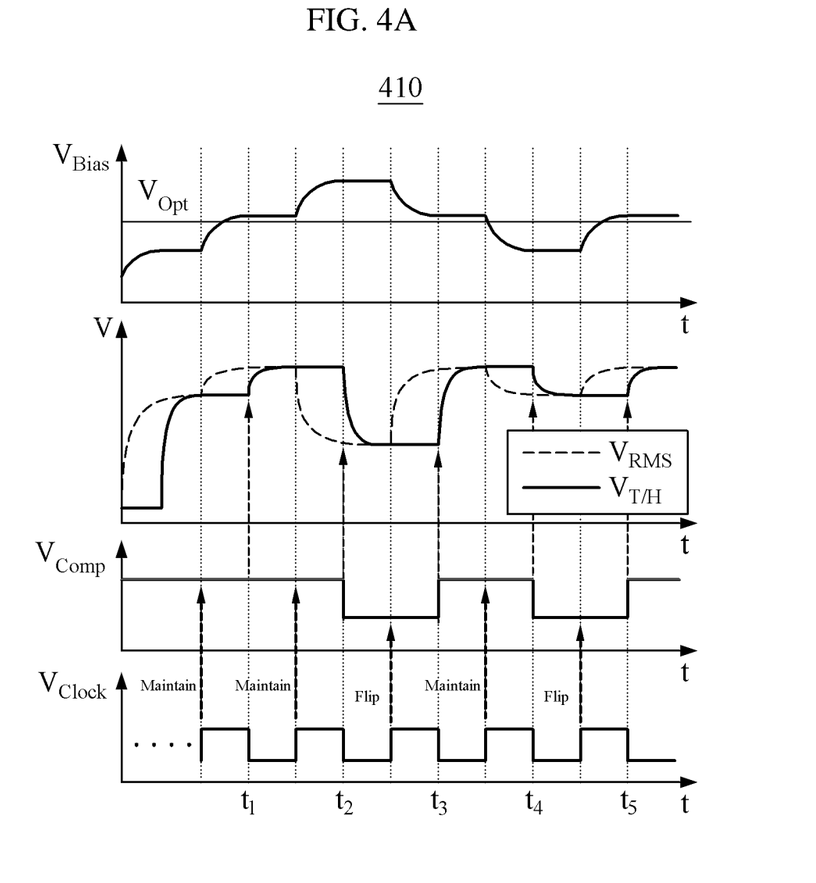
FIG. 4A and FIG. 4B illustrate timing diagrams, optical power, and root mean square (RMS) output characteristic curves according to an example embodiment.
Figure 4B:
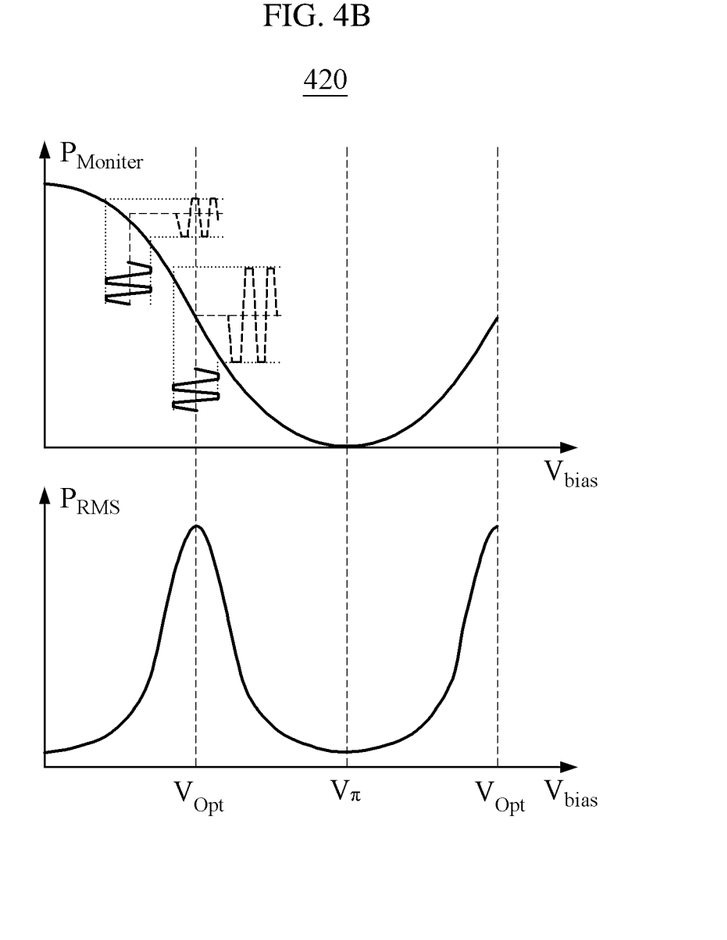

FIG. 4A and FIG. 4B illustrate timing diagrams, optical power, and RMS output characteristic curves according to an example embodiment.

Timing diagrams 410 of FIG. 4A show an operation of a bias control apparatus according to an example embodiment. Referring to the timing diagrams 410 of FIG. 4A, a bias voltage may be dithered and be maintained to be around an optimal voltage by iterating up and down of a counter using $V_{Bias}$.

In detail, $V_{Bias}$ may be generated using the counter of which a direction is controlled to be up or down. To determine a control direction of the counter to be up or down, $V_{Comp}$ that is a comparison value between an output voltage $V_{RMS}$ and a track hold value $V_{T/H}$ may be used.

That is, if $V_{Comp}=1$, an up or down direction of the counter matches a direction in which an amplitude of data increases and a corresponding direction of the counter is maintained. Meanwhile, in a section in which $V_{RMS}$ is less than $V_{T/H}$, $V_{Comp}=0$. That is, the up or down direction of the counter matches a direction in which the amplitude of data decreases and thus, a corresponding direction of the counter needs to be switched. Through the above process, the bias voltage may be dithered with getting to be close to an optimal voltage and be maintained to be around the optimal voltage through iteration of up or down of the counter.

Graphs 420 of FIG. 4B show an optical power of an MZM generated through an RMS power detector and a characteristic curve of output voltage $V_{RMS}$ according to the optical power. Referring to the graphs 420 of FIG. 4B, subsequent circuits may control a bias so that an RMS value of the data amplitude may be maximize $V_{Opt}$ using the converted the output voltage $V_{RMS}$. Although the graphs 420 of FIG. 4B show the characteristic curve of the MZM as an example, the output voltage $V_{RMS}$ needs to be maximized even in a characteristic curve of an RM.

Figure 5:
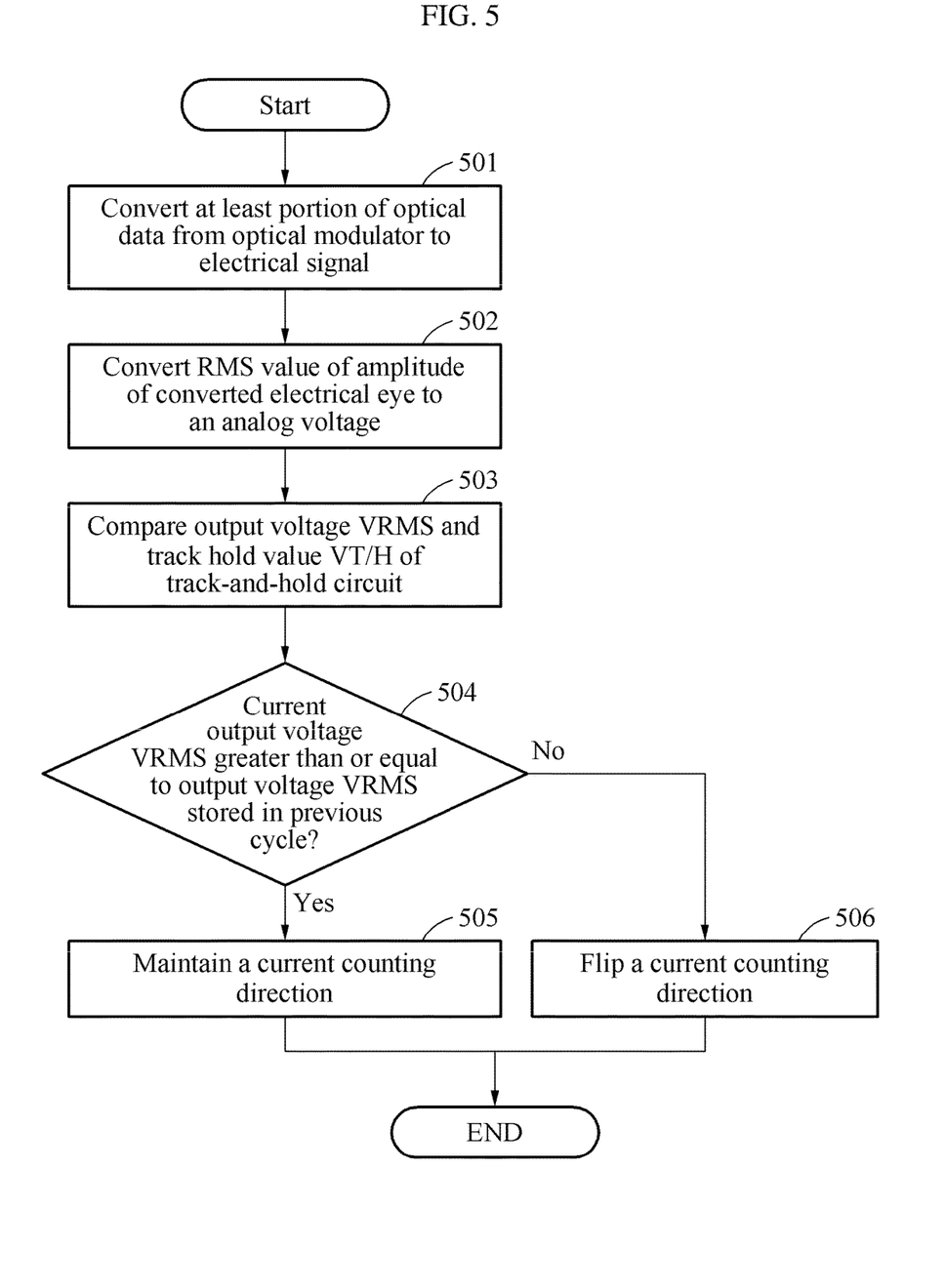
FIG. 5 is a flowchart illustrating a bias control method according to an example embodiment.

FIG. 5 is a flowchart illustrating a bias control method according to an example embodiment.

Referring to FIG. 5, in operation 501, the bias control method converts at least a portion of data included in an output from an optical modulator to an electrical signal.

In operation 502, the bias control method converts an RMS value of an amplitude of converted data to an output voltage $V_{RMS}$, and outputs the output voltage $V_{RMS}$.

In operation 503, the bias control method compares the output voltage $V_{RMS}$ and a track hold value $V_{T/H}$ of a track-and-hold circuit. For example, the bias control method may compare the output voltage $V_{RMS}$ and output of the track-and-hold circuit value $V_{T/H}$ at a falling edge of a clock signal that passes an inverter. In detail, to determine a control direction, two inputs, for example, the output voltage $V_{RMS}$ and output of the track-and-hold circuit value $V_{T/H}$ may be compared at the falling edge of the clock signal by applying the inverter to the clock signal at a rear end of the RMS power detector.

When an RMS value of amplitude is greater or less than a value stored in a previous cycle, 1 is output as a result value of comparison, that is, an output $V_{Comp}$ in operation 503. In this situation, an up or down direction of a counter matches a direction in which the amplitude of data increases and thus, the corresponding direction of the counter is maintained. Meanwhile, when the RMS value is less than the value, the result value, 0, is output.

In operation 504, the bias control method may determine whether a current output voltage $V_{RMS}$ is greater or less than the output voltage $V_{RMS}$ stored in the previous cycle based on the comparison result of operation 503.

When it is determined that the current output voltage $V_{RMS}$ is greater or less than the output voltage $V_{RMS}$ in operation 504, the bias control method may maintain the up or down direction of the counter in operation 505.

On the contrary, when it is determined that the current voltage $V_{RMS}$ is less than the output voltage $V_{RMS}$ in operation 504, the bias control method may switch the up or down direction of the counter in operation 506.

That is, when the up or down direction of the counter matches a direction in which the amplitude of data increases, the corresponding direction of the counter is maintained. When the RMS value becomes a further smaller, the output $V_{Comp}$ of a comparator becomes 0. That is, since the up or down direction of the counter matches a direction in which the amplitude of data decreases, the corresponding direction of the counter needs to be switched.

With an increasing need for high speed data transmission, the demand for an optical communication interface is also on the increase. Accordingly, an optical interface in addition to optical modulators may have some marketability with the developments in a silicon-photonics process. However, in an aspect of producing and substantially using optical elements, a bias control according to a temperature is required. In particular, if the optical elements may be integrated into a single chip together with an optical modulator using the silicon-photonics process according to an example embodiment, it is possible to achieve an enhanced degree of integration and to dramatically reduce an area and power compared to an existing method using a pilot tone.

The units described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or transitorily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM, random access memory (RAM, flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

Although a few example embodiments have been shown and described, the present disclosure is not limited to the described embodiments. Instead, it would be appreciated by those skilled in the art that changes may be made to these embodiments without departing from the principles and spirit of the disclosure, the scope of which is defined by the claims and their equivalents.

What is claimed is:

1. A bias control apparatus comprising:
    a photodetector configured to convert at least a portion of data included in an output from an optical modulator to an electrical signal;
    a power detector configured to convert a root mean square (RMS) value of an amplitude of the converted data to an output voltage;
    a track-and-hold circuit configured to output a signal that periodically iterates a track and a hold based on a clock signal;
    a comparator configured to compare the output voltage from the power detector and a value of the output signal from the track-and-hold circuit at a falling edge of an inverted clock signal that is an output signal from an inverter generated by applying the clock signal to the inverter, and a bias controller configured to control a bias voltage to be dithered and to be maintained within a preset range from an optimal voltage based on the comparison result, wherein the comparator is further configured to determine up or down of a counter based on whether a current output voltage from the power detector is greater than an output voltage pre-stored in the track-and-hold circuit in a previous half cycle, wherein the comparator is further configured to determine an up or down direction of the counter to match a direction in which the amplitude of the data increases and the direction of the counter to be maintained when the current output voltage from the power detector is greater than or equal to the output voltage pre-stored in the track-and-hold circuit in the previous half cycle, and wherein the comparator is further configured to determine an up or down direction of the counter to match a direction in which the amplitude of the data decreases and the direction of the counter to be switched when the current output voltage from the power detector is less than the output voltage pre-stored in the track-and-hold circuit in the previous half cycle.

2. The bias control apparatus of claim 1, wherein the bias controller comprises:

a digital controller configured to output a counter for controlling up or down of the bias voltage based on the comparison result; and a digital-to-analog converter configured to convert the output counter to an analog form, and the optical modulator is further configured to receive the analog-converted output of the counter and to control a bias.

3. The bias control apparatus of claim 1, wherein the track-and-hold circuit is further configured to control the output voltage to be transitorily stored during a single cycle.

4. The bias control apparatus of claim 1, wherein the comparator is further configured to compare the output voltage from the power detector and an output value of the track-and-hold circuit corresponding to a hold state of the track-and-hold circuit.

* * * * *